United States Patent [19]

Collier et al.

[11] 4,426,772

[45] Jan. 24, 1984

[54] APPARATUS FOR INSTALLING TERMINALS ON WIRES AND INSULATION PODS ON TERMINALS

[75] Inventors: John C. Collier, York; David L. Lehman, Lewisberry, both of Pa.

[73] Assignee: Burndy Corporation, Norwalk, Conn.

[21] Appl. No.: 235,619

[22] Filed: Feb. 19, 1981

[51] Int. Cl.³ .............................................. B23P 19/00

[52] U.S. Cl. .................................... 29/742; 29/564.1; 29/715; 29/747; 29/753; 29/759; 29/863; 29/881

[58] Field of Search ................. 29/742, 747, 751, 753, 29/564, 1, 564.6, 857-859, 881, 883, 715, 863, 759

[56] References Cited

U.S. PATENT DOCUMENTS

| | | | |
|---|---|---|---|
| 3,329,002 | 7/1967 | Schwalm | 29/753 |
| 4,074,424 | 2/1978 | Deshich et al. | 29/754 |
| 4,139,937 | 2/1979 | L'Homme | 29/754 |
| 4,178,679 | 12/1979 | Lichtenstein | 29/715 |
| 4,214,361 | 7/1980 | Coldren et al. | 29/753 |

OTHER PUBLICATIONS

*AMP Production Tooling*, Cat. #1675, 3M/WAC, AMP of Great Britain, Ltd. Terminal House, Stanmore, Great Britain, p. 3.

*Primary Examiner*—Carl E. Hall
*Assistant Examiner*—P. W. Echols
*Attorney, Agent, or Firm*—Perman & Green

[57] ABSTRACT

Apparatus to automatically attach a terminal to electrical wire and thereafter to install insulating pods on the terminal. The apparatus includes a press which attaches the terminal to form a terminated wire and a transfer block which moves the terminated wire to an insulation pod installation station. The pods are delivered to the pod installation station in an interconnected fashion so as to form a strip of pods. The first pod on the strip is separated from the rest of the strip and placed on the terminated wire.

8 Claims, 8 Drawing Figures

SECTION A-A

APPARATUS FOR INSTALLING TERMINALS ON WIRES AND INSULATION PODS ON TERMINALS

BACKGROUND OF THE INVENTION

This invention relates generally to an apparatus for making electrical lead wires, and more particularly, to an apparatus for placing pods on terminals on electrical lead wires after the terminals are placed on the lead wires.

In electrical connector technology, electrical device interconnect wires, or electrical lead wires, are prepared into short lengths and stripped at both ends. The wires then have terminals attached to each end thereof which are used to make connections between the contact points, such as blade connectors, on electrical devices. In many installations, the interconnect wires are required to be installed onto very closely-spaced contact points. In these applications, it is desirable to place insulation pods over the terminals so that there is no possibility of a short circuit developing between adjacent terminals or contact points during operation. These pods are generally installed on the terminal after the terminal has been crimped to the interconnect wire.

In one type of apparatus for installing insulation pods onto terminated interconnect wires, the pods are loaded into a hopper from which they are fed to the target area for installation. The hopper vibrates to feed, sort and position the pods into proper orientation for placement on the terminals. The operator inserts a terminated interconnect wire and depresses a foot switch. The apparatus pushes the pod onto the terminal and another pod is advanced to the installation area.

One deficiency with the above device is that the hopper does not always sort and feed the pods in the proper way for placement in the target area. It has been found that the vibrating device is very greatly affected by changes in relative humidity. Under certain conditions, such devices become unreliable as far as their ability to orient the pods correctly for installation on the terminals.

Another prior art device of interest relative to the present invention is an automatic system for terminating and cutting cord with the use of a transfer arm. In this device, plastic cord is fed by a feed tube from an endless supply into a press where mechanical fastener terminals are crimped onto the end of the cord. Through the use of the transfer arm, which pivots at one end and is attached to the feed tube on the other end, the terminated cord is transfered to a cutting position. Thus, this device automatically terminates a cord, transfers the cord to a second position, feeds the proper length of cord from the endless supply, cuts the cord and sends the cut cord to a delivery station.

The present invention is used with interconnectable pods which can be delivered to the pod installation station in strip fashion. These pods can be pre-inspected prior to their being made up into strips. An example of suitable pods is disclosed in United Kingdom application, No. 37791/78, filed on Sept. 22, 1978, and entitled "Interlocking Housings."

Accordingly, it is a primary object of the present invention to improve the installation of interlocking insulation pod housings onto terminated wires.

It is another object of the present invention to provide an apparatus for installing pre-inspected pods automatically onto terminated wires.

It is another object of the present invention to provide automatic separation of strips of interconnected pod housings.

It is another object of the present invention to combine in one automatic apparatus the functions of lead wire termination and insulating pod installation.

It is another object of the present invention to contain lead wire termination and pod installation operations in a relatively small space.

SUMMARY OF THE INVENTION

Briefly stated, and in accordance with the present invention, there is provided an apparatus for automatically terminating electrical lead wires and placing insulation pods over the terminals. A two-station apparatus is disclosed in which a terminal is applied to the electrical lead wire at the first station and insulation pod is placed over the terminal at the second station. The first station contains a press which attaches the terminal and positions the electrical lead wire on a transfer means. The transfer means then moves the electrical lead wire to the second station. The lead wire is removed from the transfer means at the second station and the transfer means returns to the first station to receive another electrical lead wire.

BRIEF DESCRIPTION OF THE DRAWINGS

Other objects and advantages of the present invention will become apparent upon reading the following detailed description with reference to the drawings wherein.

While the present invention is described in connection with a preferred embodiment and associate method of use thereof, it should be understood that it is not intended to limit the invention to this embodiment and method of use. On the contrary, it is intended to cover all alternatives, modifications and equivalents as may be included within the spirit and scope of the invention as defined by the appended claims.

DETAILED DESCRIPTION OF THE INVENTION

Figure 1:
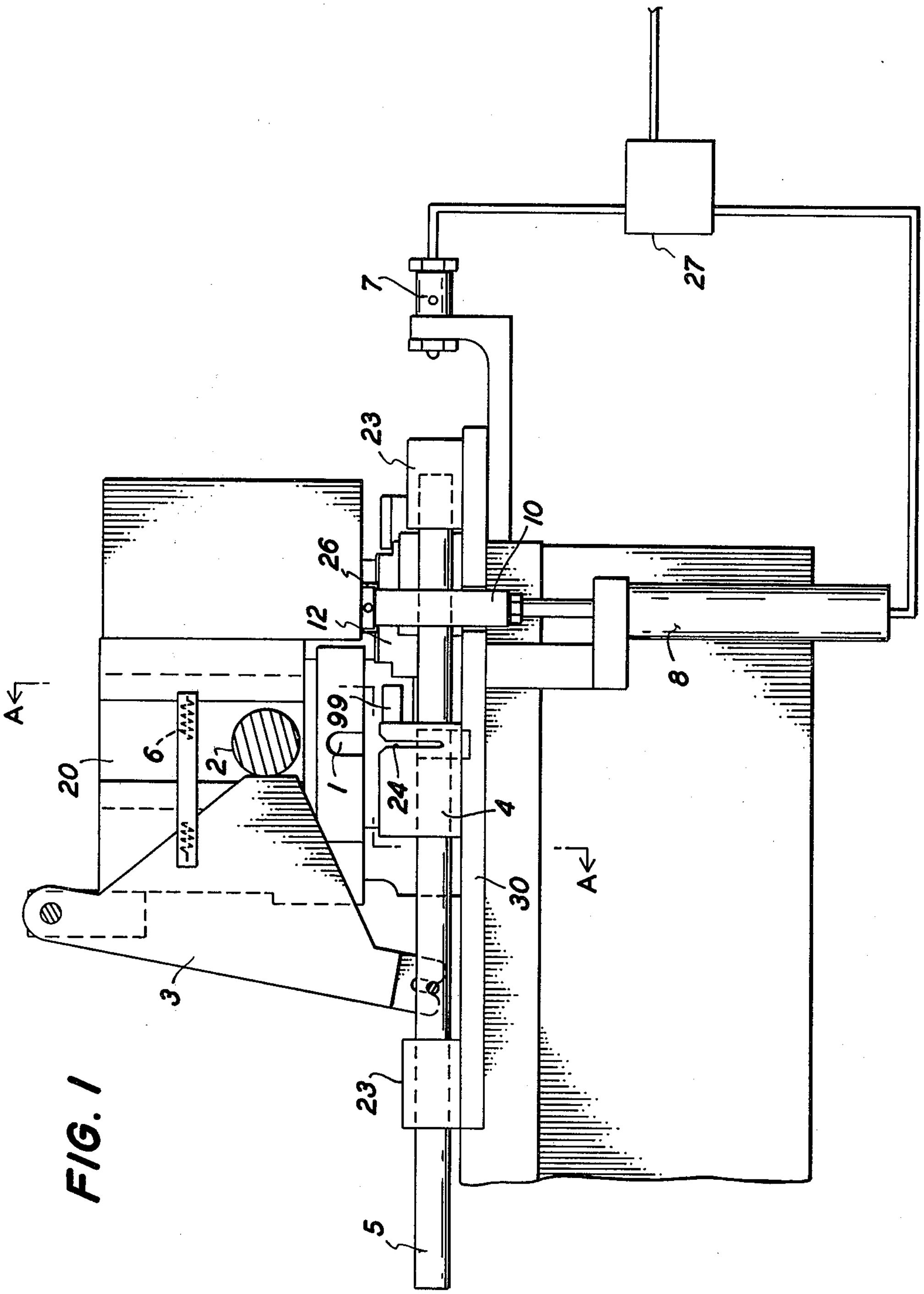
FIG. 1 illustrates a preferred embodiment of the apparatus and shows a front view of the termination station and pod installation station.
Figure 2:
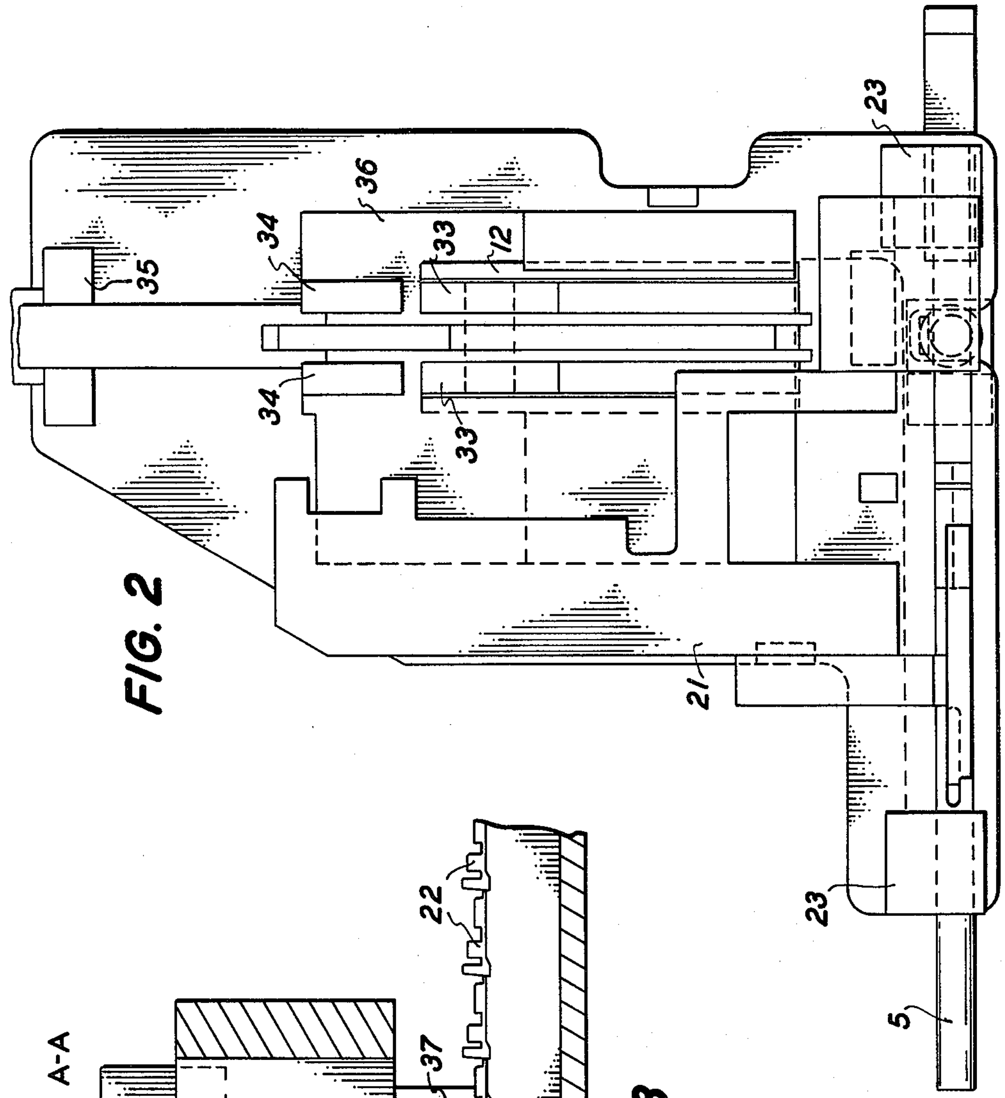
FIG. 2 is a top view of the apparatus shown in FIG. 1.

Referring more particularly to the drawings, wherein like reference numerals have been used throughout to designate like elements, FIGS. 1 and 2 illustrate schematically one embodiment of the combined terminating press and pod installation apparatus.

The apparatus is activated by an operator feeding the end of an electrical lead wire into the first station, the left portion of the apparatus shown in FIG. 1, and against switch plate 1. Switch plate 1 acts as a sensor and by placing the end of the wire against it, the plate moves slightly and closes the switch. The switch activates the press which attaches a terminal to the wire. The terminal attaching apparatus can be of any suitable type available such as the Burndy Universal Terminating Machine, "UTM", manufactured by Burndy Corporation, Norwalk, Conn. This type of press automatically feeds a strip of terminals to a crimping station which includes an anvil and crimping blade mounted on a ram. When a wire is placed in the anvil area, the press ram is cycled so that the crimping blade falls onto the first terminal fed to the anvil area and crimps it onto the wire. A severing blade is also activated by the ram which severs the first terminal from the strip.

Figure 3:
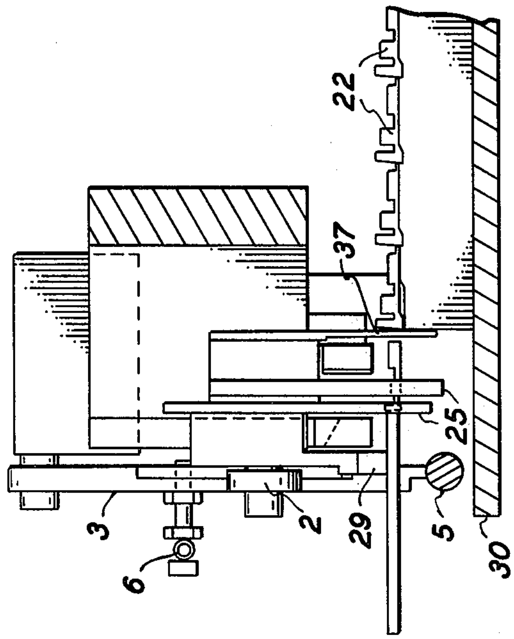
FIG. 3 is a side view of the terminating press taken through section AA of FIG. 1.

The press includes ram 20 which begins its descent to attach the terminal to the wire when switch 1 senses the presence of an electrical lead wire. As can be better seen in FIG. 3, a strip of terminals 22 is fed into the crimping blade 25 area. The blade, together with the underlying anvil, crimp the terminal onto the end of the wire. At the same time, terminal shear blade 37 shears the terminal just crimped onto the wire from the strip of terminals.

Referring to FIG. 1, as the ram descends, ball bearing 2, which is attached to the ram, drives cam 3 in the clockwise direction. Cam 3 is normally biased to the right by spring 6. Cam 3 is joined to transfer rod 5 which rides in bearings 23. The view of the apparatus shown in FIG. 1 is taken sometime after the cycle of the ram has begun and cam 3 places transfer block 4 in the terminating station.

Transfer block 4 has a controlled oscillation between the terminating station, where it is shown in FIG. 1, and the pod installation station in the region of pod 26, also shown in FIG. 1. Transfer rod 5 enables transfer block 4 to oscillate between these two stations. Transfer block 4 has slot 24 located thereon. As the wire inserted into the press has a terminal crimped thereon, the wire is pushed down, and lodged in, slot 24 by tamping blade 29. The tamping blade is brought onto the wire as the crimping action occurs. Tamping blade 29 is not visible in FIG. 1 because transfer block 4 is in front of it, but it is clearly visible in FIG. 3. The tamping blade shown is V-shaped and is attached to and moves with ram 20. Base plate 30 carries bearings 23 and otherwise provides support within the structure.

As the ram moves up, spring 6 brings cam 3 in the counter clockwise direction after ball bearing 2 is lifted sufficiently. As this occurs, transfer block 4, now carrying the wire, is moved to the right, as viewed in FIG. 1, bringing the terminated wire to the region directly under pod 26.

The terminated wire is now in the pod installation station. As transfer block 4 reaches the pod installation station, the right end of transfer rod 5 contacts pilot sensor 7 thereby activating air valve 27. Air valve 27 controls the activation of clamp air cylinder 8 and feed air cylinder 9. If the operator holds onto the wire held on transfer block 4 as the block passes to the right, the pod station is not activated because rod 5 does not contact pilot sensor 7. This provides a safety feature in the machine so that pods will not be fed until the terminated wire is in exactly the right position.

Clamp air cylinder 8 raises clamp member 10 which pushes the wire out of slot 24. As can be seen most clearly in FIG. 4, the clamp member pushes the wire out of slot 24 and immediately onto wire clamp block 11 which is biased in the downward position. Wire clamp block 11 is pushed up by clamp member 10 and the wire until block 11 seats against applicator body 21. The terminated wire is prevented from twisting, especially relative to the pod delivery position, by block 11 and member 10 as it is removed from transfer block 4. At this time, terminated wire 38 is in its pod receiving position and free of transfer block 4.

Figure 4:
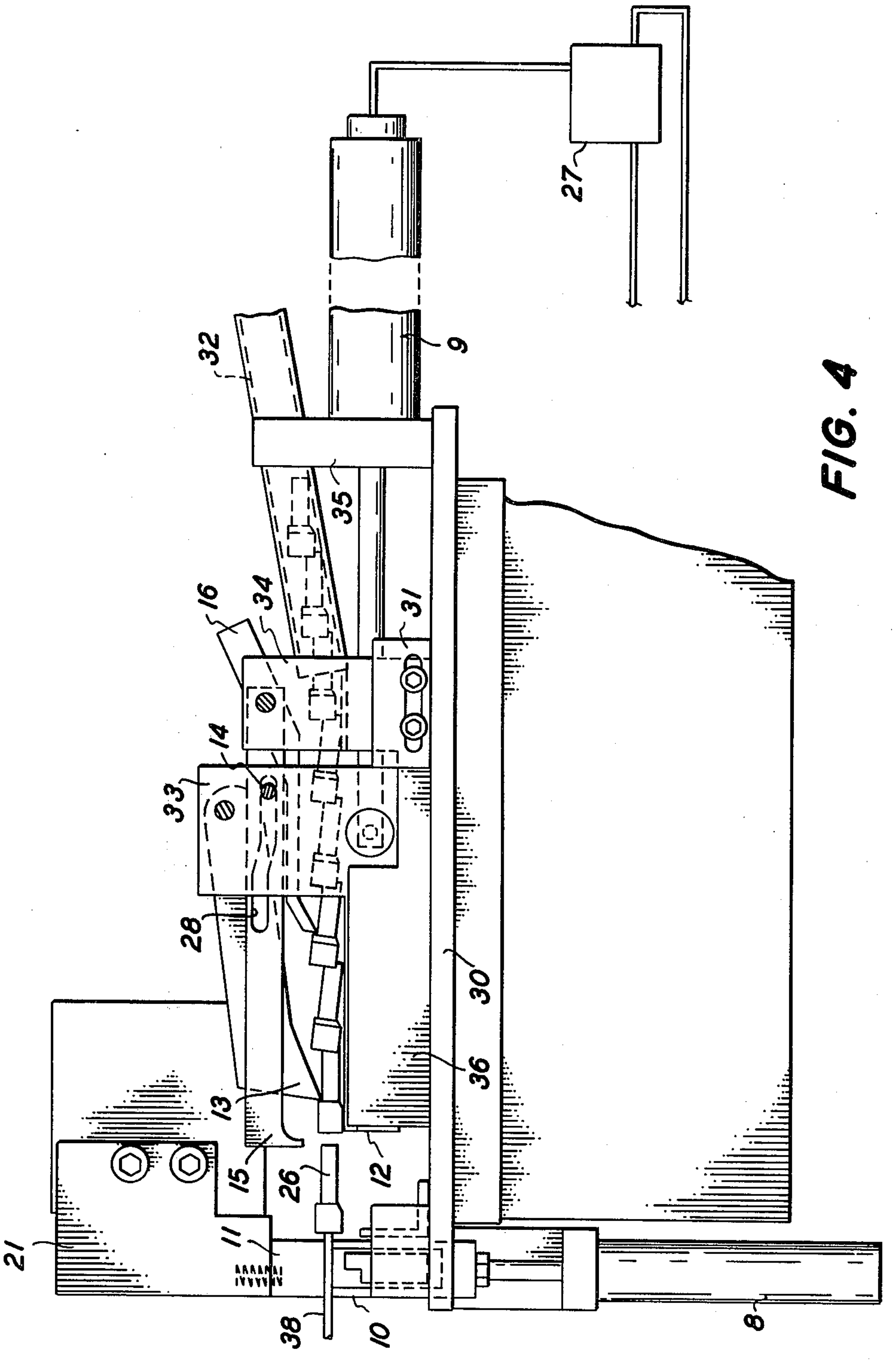
FIG. 4 is a side view of the pod installation station before a pod is fed from the strip of pods to a terminal.

Continuing to refer to FIG. 4, there is shown slide 12 upon which the strip of interconnected pods rest. The strip of pods is actually fed by feed finger 13. The finger is attached to pin and feed finger support 33 and allowed to rotate thereabout. Separators 15, for separating the first pod from the rest of the strip, are attached to and pivot about backlatch and separator support 34.

Support 34 is fixedly mounted on the frame of the apparatus while pin and feeder finger support 33 moves with slide 12. Although only one is visible in FIG. 4, there are two separators 15, one on each side of feed finger 13. Separators 15 contain a cam slot 28 which carries the separators on pin 14. Pin 14 is rigidly attached to support 33.

Figure 5:
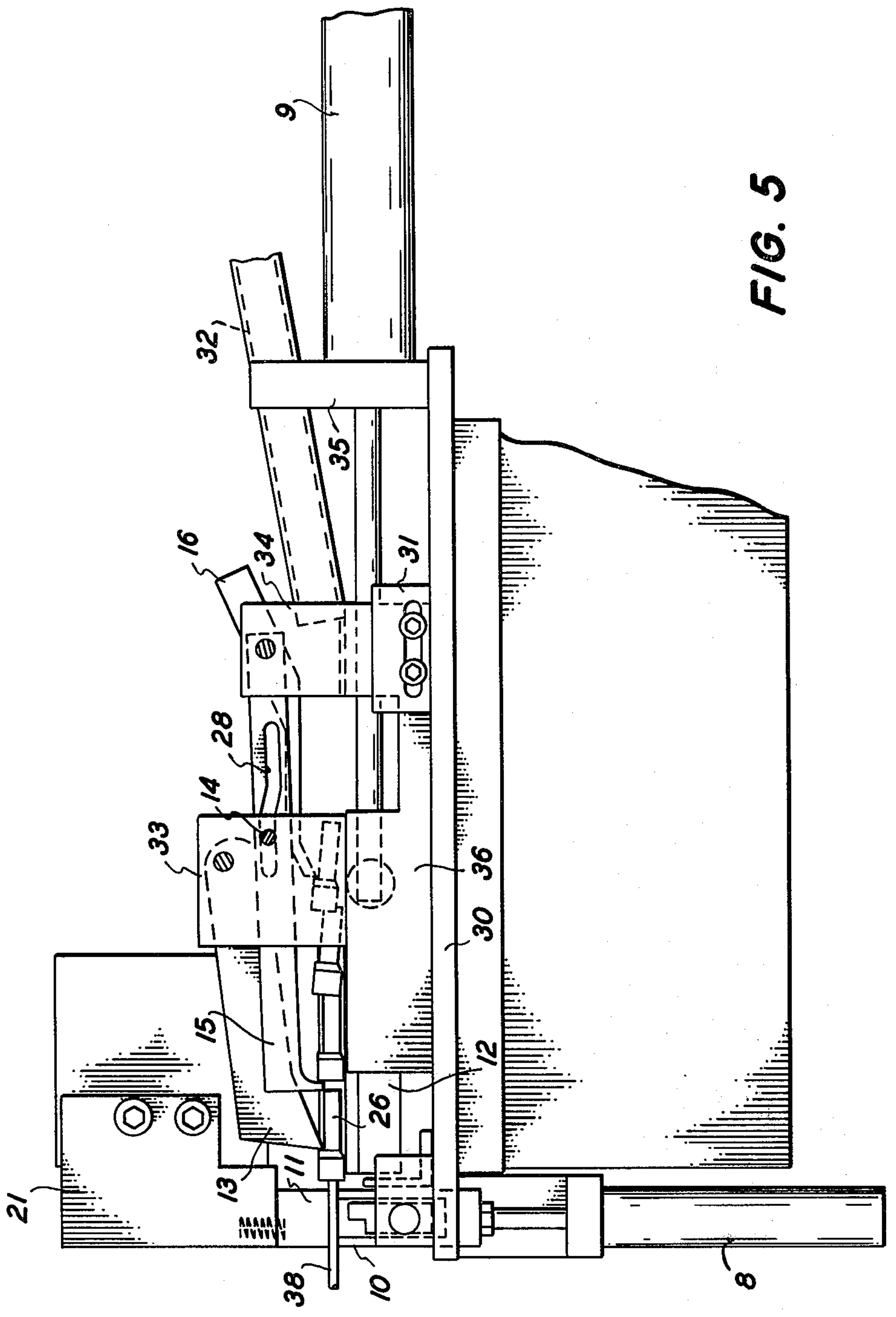
FIG. 5 is a side view of the pod installation station after a pod has been fed from the strip of pods onto a terminal.
Figures 6A, 6B, 6C:
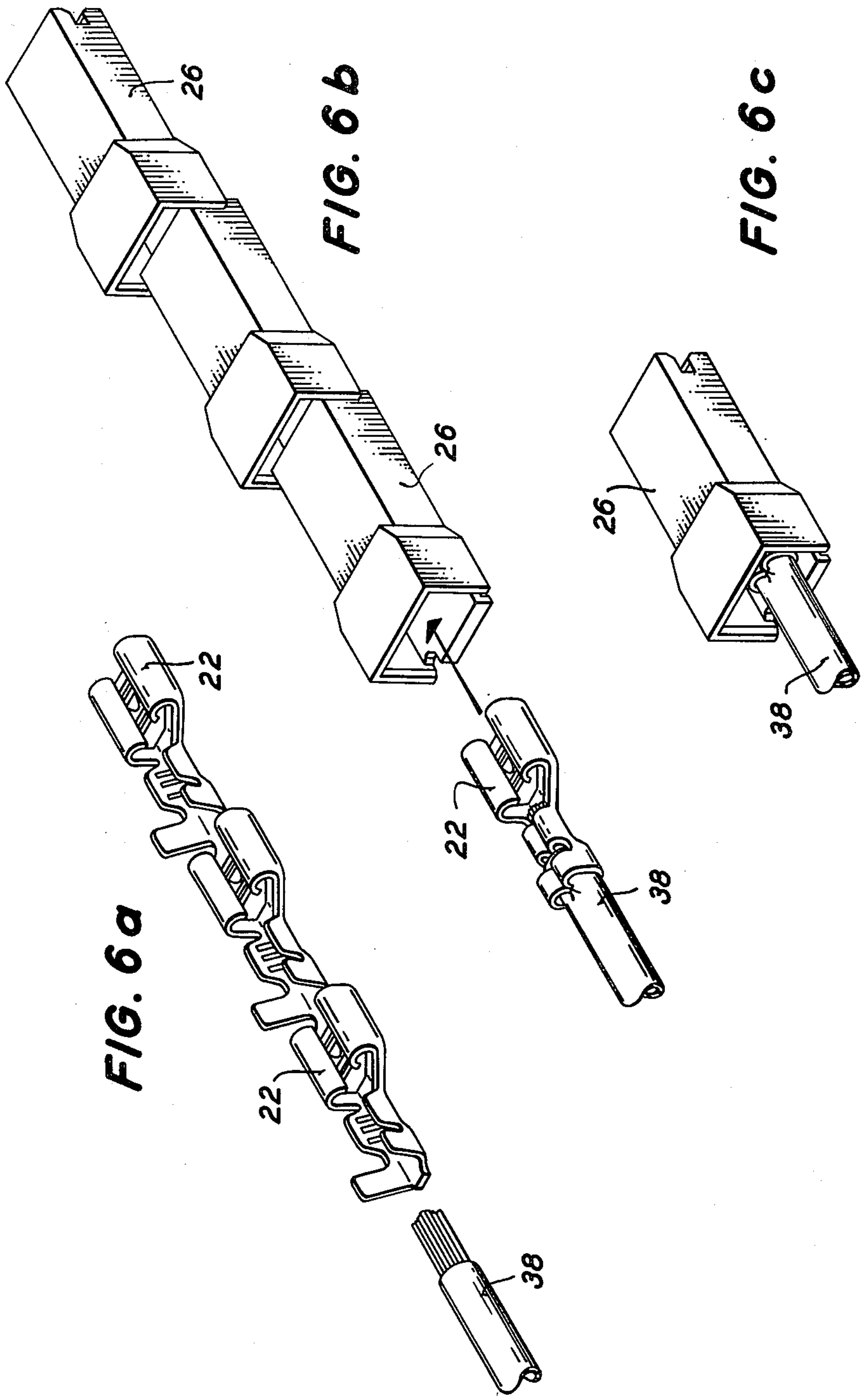
FIG. 6*a* schematically illustrates the electrical lead wire before termination in the press.
FIG. 6*b* schematically illustrates the terminated wire before installation of the pod.
FIG. 6*c* schematically illustrates the terminated wire after the pod is installed.

The strip of interconnected pods is delivered to the installation area through pod feed tube 32. The strip is kept from moving back towards chute 32 by backlatch 16. The backlatch is adapted to rotate about the pin connecting it to support 34 so that it can ride up over the front edge of the pods as the pods are being fed into the installation area. However, backlatch 16 prevents the pods from moving to the right, in FIGS. 4 and 5, by lodging itself against the shoulder area of the pod. Rear stop 31 is provided for slide 12 to limit its motion back away from the installation station. Cylinder 9 is mounted on cylinder mount 35 and the entire pod installation structure is supported by main block 36.

The following is a description of how the above described components operate together to automatically terminate an electrical lead wire and then install a pod on the terminal. The sequence is as follows. Stripped wire is hand fed into the terminating station against switch plate 1 thereby activating the press. Ram 20 of the press descends within applicator body 21. Terminals 22 are fed forward during the descent of the ram. Ball bearing 2, which is carried with the ram, pivots cam 3 thereby moving transfer rod 5 to the left in FIG. 1. Rod 5 slides freely in bearings 23.

Slot 24, in transfer block 4, is moved in line with the wire. The wire is pushed down into the slot by tamping blade 29 at the same time that blade 25 crimps the terminal onto the wire. After crimping, the ram ascends and ball bearing 2 moves off of cam 3 allowing spring 6, which is attached to applicator body 21, to pull cam 3 to the right in FIG. 1. As cam 3 moves in the counter clockwise direction, transfer rod 5 and transfer block 4, containing the terminated lead wire, move to the pod installation station. The terminated lead wire, more importantly its terminal, is now aligned vertically with pod 26 in the pod installation station.

Transfer arm 5 contacts pilot sensor 7 which stops movement of the transfer arm and actuates air valve 27 allowing air to be fed to operating cylinders 8 and 9. Air valve 27 activates clamp cylinder 8 and feed cylinder 9. Clamp cylinder 8 moves clamp member 10 up, pushing the lead wire, now having a terminal on it, out of the transfer block 4 and up against spring-loaded wire clamp block 11. With the terminated lead in this position, the transfer block is allowed to move to the left upon the beginning of the next press cycle without interference with the wire. Block 11 is pushed up against the action of its spring to ultimately seat on the applicator body 21. This action locates the terminal adjacent and in line with the pod. The spring/block arrangement reduces the possibility of the terminal twisting, and thus, becoming misaligned with the pod as it is being pushed out of slot 24.

Feed cylinder 9 pushes slide 12 forward. Valve 27 actuates both cylinders 8 and 9 at the same time, but clamp member 10 completes its movement before slide 12. This is to assure that the terminated lead wire is clamped into position before a pod is placed thereon. Feed finger 13, mounted on slide 12, pushes the first pod in the strip forward by pushing against its shoulder. As slide 12 moves forward, pin 14 rides in cam slot 28. Separators 15 drop into position in front of the second pod in the strip as they follow the cam slot profile. The separators are now in position to hold back the second pod while the first pod is being pushed into the installation station. As slide 12 continues moving forward, and feed finger 13 continues to push the first pod towards the terminal and away from the strip, the second pod is uncoupled from the first by separators 15 holding back the second pod. Feed finger 13 pushes the first pod onto the terminal located within the pod installation station. The pod is always supported by slide 12 during this operation.

This completes the terminating and pod installation cycle for the first electrical lead wire placed into the apparatus. However, another lead wire can be fed against switch plate 1 immediately. In fact to maintain maximum productivity, the operator should place a second wire into the terminating station just as soon as the first wire is brought to the pod installation station. Assuming another wire is placed in the terminating station and the switch plate activated, the press will begin a new cycle. Transfer arm 5 moves to the left and pilot sensor 7 is released. This, in turn, deactivates valve 27. Clamp cylinder 8 moves clamp member 10 down thereby releasing the previous wire upon which a pod has been placed in the previous cycle. This wire is then pushed down by the action of the spring on clamp block 11 to a level where the protruding portion 99 on the right end of block 4, as viewed in FIG. 1, pushes this wire out of the installation station. This occurs as the transfer block moves from the terminating station to the pod installation station carrying the next wire.

In an alternative arrangement, other means could be adapted to the system to remove the previous wire from the installation station. Such alternatives could include, for instance, an air nozzle which places a properly timed jet of air on the wire thereby forcing it out of the station. Also, the apparatus could be oriented in such a way that the force of gravity carries the wire from this station without any additional means to aid the removal process.

Feed cylinder 9 moves slide 12 to the rear and backlatch 16 holds pods in position. Feed finger 13, as it rides back, moves up over the first pod in the strip to clear it. In actuality, the steps immediately above are carried out between the time another wire is hand fed against switch plate 1, thereby activating the press, and the time that the terminal is crimped onto the wire by crimping blade 25.

The pod installation station is shown in combination with a terminating station in the above described embodiment. This station could be a separate apparatus if conditions made such desirable, and it does not necessarily have to be combined with the terminating press in the manner described. For instance, the pod installation apparatus, if made the subject of free-standing device, could be located in any position desired relative to the conveyor on a suitable multi-stationed wire terminating machine. An example of such a machine is the Artos C-59AT machine made by Artos Engineering Company, New Britain, Wis. It could also be used to provide a sole operation unrelated and unintegrated with any other equipment.

It should be understood that the foregoing description is only illustrative of the invention. Various alternatives and modifications in the structural and functional features of the apparatus for installing terminals on wires and insulation pods on terminals can be devised by those skilled in the art without departing from the invention. Accordingly, the present invention is intended to embrace all such alternatives, modifications and variations and fall within the spirit and scope of the appended claims.

What is claimed is:

1. Apparatus for attaching a terminal to a wire and thereafter installing a pod on the terminal comprising:

(a) means for attaching the terminal onto the wire in response to the wire being placed into a terminating station thereby producing a terminated wire, (b) means for placing the terminated wire on a transfer means at the terminating station, (c) means for moving the transfer means and wire to an adjacent pod installation station, (d) means for removing the terminated wire from the transfer means, and (e) means for installing a pod onto the terminal wherein the pods are fed to the pod installation station in a strip interconnected to one another, said installing means including means for separating the first pod from the strip before it is installed onto the terminal.

2. The apparatus in claim 1 further including means for moving the transfer means back to the terminating station after the terminated wire has been removed from the transfer means and another wire is placed into the terminating station.

3. The apparatus in claim 1 wherein the means for attaching the terminal onto the wire and means for placing the terminated wire on the transfer means are activated by a ram means.

4. The apparatus in claim 1 wherein the means for removing the terminated wire from the transfer means includes means for preventing the terminal on the wire from becoming misaligned with the pod as it is removed from the transfer means.

5. The apparatus in claim 1 wherein the means for separating the first pod from the strip includes means for axially advancing the first pod in the strip while restraining the advance of the other pods in the strip.

6. The apparatus in claim 1 further including means for removing the terminated wire from the pod installation station after the pod is installed thereon.

7. The apparatus in claim 6 wherein the means for removing the terminated wire from the pod installation station comprises part of the transfer means.

8. Apparatus for attaching a terminal to a wire and thereafter installing a pod on the terminal in response to a wire being placed into a terminating station comprising:

(a) means for crimping a terminal onto the wire at the terminating station thereby producing a terminated wire, (b) means for activating the crimping means in response to a wire being placed into the terminating station, (c) a pod installation station adjacent the terminating station, (d) transfer means for moving a terminated wire from the terminating station to the pod installation station, (e) slot means on the transfer means for receiving a terminated wire, (f) tamping means for placing the terminated wire into the slot means, (g) means for moving the transfer means from the terminating station to the pod installation station after a terminated wire is received thereon, (h) means for removing the terminated wire from the transfer means and holding the wire securely in the pod installation station, and (i) means for installing a pod onto the terminal of the terminated wire in the pod installation station.

* * * * *